US006078269A

United States Patent [19]

Markwell et al.

[11] Patent Number: 6,078,269

[45] Date of Patent: Jun. 20, 2000

[54] BATTERY-POWERED, RF-INTERCONNECTED DETECTOR SENSOR SYSTEM

[75] Inventors: Scott Markwell, Roanoke, Va.; David L. Hanning, Huntsville, Ala.; Alan Fox, Huntsville, Ala.; Bill Evans, Huntsville, Ala.; Jack Ellis, Huntsville, Ala.; Richard Goldblatt, Kings Park, N.Y.; Bob Matson, Orange City, Fla.

[73] Assignee: Safenight Technology Inc., Roanoke, Va.

[21] Appl. No.: 08/967,760

[22] Filed: Nov. 10, 1997

[51] Int. Cl.[7] ............................ H04Q 5/22; G08B 17/10; G08B 23/00

[52] U.S. Cl. ....................... 340/825.5; 340/539; 340/628; 340/517; 340/577; 340/584; 340/825.69

[58] Field of Search .................................... 340/539, 517, 340/628, 508, 514, 521, 577, 584, 629, 630, 825.07, 825.16, 825.38, 825.54, 825.69

[56] References Cited

U.S. PATENT DOCUMENTS

| | | | |
|---|---|---|---|
| Re. 32,327 | 1/1987 | Biba et al. | 370/445 |
| 4,207,559 | 6/1980 | Meyer | 340/531 |
| 4,284,849 | 8/1981 | Anderson et al. | 379/38 |
| 4,363,031 | 12/1982 | Reinowitz | 340/539 |
| 4,367,458 | 1/1983 | Hackett | 340/539 |
| 4,417,235 | 11/1983 | Del Grande | 340/531 |
| 4,481,502 | 11/1984 | Dawson | 340/516 |
| 4,617,560 | 10/1986 | Gutmann | 340/628 |
| 4,672,365 | 6/1987 | Gehman et al. | 340/539 |
| 4,673,920 | 6/1987 | Ferguson et al. | 340/521 |
| 4,734,680 | 3/1988 | Gehman et al. | 340/539 |
| 4,812,820 | 3/1989 | Chatwin | 340/518 |
| 4,951,029 | 8/1990 | Severson | 340/506 |
| 5,386,209 | 1/1995 | Thomas | 340/539 |
| 5,402,466 | 3/1995 | Delahanty | 379/44 |
| 5,459,450 | 10/1995 | Beghelli | 340/538 |
| 5,486,811 | 1/1996 | Wehrle et al. | 340/522 |
| 5,557,262 | 9/1996 | Tice | 340/587 |
| 5,565,852 | 10/1996 | Peltier et al. | 340/632 |
| 5,578,989 | 11/1996 | Pedtke | 340/539 |
| 5,583,488 | 12/1996 | Sala et al. | 340/568 |
| 5,587,705 | 12/1996 | Morris | 340/628 |
| 5,589,821 | 12/1996 | Sallen et al. | 340/573 |
| 5,633,501 | 5/1997 | Ameleshi et al. | 250/381 |

*Primary Examiner*—Hassan Kizou
*Assistant Examiner*—Saba Tsegaye
*Attorney, Agent, or Firm*—Arthur L. Plevy; Buchanan Ingersoll PC

[57] ABSTRACT

A wireless, battery-operated detection system of a plurality of RF-interconnected detectors is operable over a CSMA-type network and intended to detect the occurrence of a local phenomena and transmit at least one signal to at least one other detector to remotely sound an alarm. Each detector includes a sensor for sensing local phenomena, a transmitter for transmitting RF messages indicative of the phenomena, a receiver for receiving the RF messages, an alarm circuit for sounding an audible alarm indicative of the phenomena and a controller operable to control the mode of operation of each detector, wherein each controller is operable to control all the detectors in the system in response to a stimulus and to control multiple and conflicting signals transmitted among the detectors. The controller includes a prioritization circuit for determining the relative priority of the received RF signals and stimuli indicative of a particular condition to enable the appropriate mode of operation. The controller also includes a timer circuit responsive to the operating mode for enabling the transmitter to transmit RF messages immediately after the receiver is sensed and no longer detects incoming message activity, and where the receiver is sensed at randomized time intervals to reduce the probability of multiple simultaneous transmissions.

24 Claims, 17 Drawing Sheets

| OPERATING MODES |
|---|
| STANDBY |
| ALARM |
| AUX2 |
| AUX3 |
| TEST |
| RESET |
| WAIT |
| LOW BATTERY |

FIG. 2A

LATCHED CIRCUIT FOR ALARM MODE

MESSAGE FORMAT OF THE WIRELESS ALARM SYSTEM

| MESSAGE TYPE | BINARY CODE |
|---|---|
| ALARM | 10111000 |
| TEST | 00011101 |
| RESET | 01000111 |
| AUX2 | 11100010 |
| AUX3 | 01110100 |

WIRELESS ALARM SYSTEM MESSAGE CODES

TRANSMIT DATA ENCODER CIRCUITRY

RECEIVE DATA DECODE CIRCUITRY

DATA CHECKING CIRCUITRY

DETECTOR UNIT PRIORITIZATION SCHEME

DETECTOR UNIT ASIC HAVING MULTIPLE SENSOR TYPES

INTERGRATED SYSTEM AT INITIALIZATION

BATTERY-POWERED, RF-INTERCONNECTED DETECTOR SENSOR SYSTEM

FIELD OF THE INVENTION

The present invention relates to detection systems in general, and more particularly, to a CSMA-type network of battery-powered, RF-interconnected, wireless sensors for detecting and alerting to emergency conditions such as smoke, fire, gas, intrusion, and the like.

BACKGROUND OF THE INVENTION

Detection systems which include a plurality of sensor units detecting and alerting to conditions such as smoke, fire, gas, motion, etc. are numerous and well known in the art. Some systems, such as those described in U.S. Pat. No. 5,587,705 for MULTIPLE ALERT SMOKE DETECTORS to Morris et al and U.S. Pat. No. 5,386,209 for CLUSTER ALARM MONITORING SYSTEM to Thomas disclose the use of different audible signals in a detector system to alert personnel of a condition as well as using RF signals to communicate with other detectors in the network. However, these systems, like many other similar systems, often require A.C. powered base stations or A.C. coupled detectors to facilitate network operation. This is disadvantageous in that it results in increased costs and network complexity such as running cables, providing connected base stations, maintaining large AC power sources, etc.

Another detector system described in U.S. Pat. No. 4,734,680 for DETECTION SYSTEM WITH RANDOMIZED TRANSMISSION to Gehman et al. discloses an integrated network of different sensors for communicating different conditions to an A.C. powered base unit or supervisory unit by means of randomized RF transmissions in order to avoid clashing between multiple units when sending to the supervising unit. While Gehman discloses a randomizing scheme for signal transmission, the Gehman et al. invention is directed toward transmission times between battery-operated sensor units and continuously active, A.C. powered base units, which are very short (on the order of milliseconds). However, transmission times between battery-powered sensing units and other similar battery-powered units are orders of magnitude longer (on the order of 10–30 seconds) to accommodate battery-saving duty cycles of receivers on the units. Thus, Gehman's system of randomly delaying transmissions between a sensor and base unit in hope of avoiding a clash is ineffective in a battery operated detection system which does not employ an A.C. base unit.

Still another system is described in U.S. Pat. No. 4,363,031 WIRELESS ALARM SYSTEM to Reinowitz, which discloses a wireless, battery-operated alarm system that contains at least three units placed in various locations throughout a building to sound an alarm when any one of them detects smoke. The units transmit and receive RF signals among one another in order to communicate the alarm condition. While this prior art avoids the problems of other systems by eliminating A.C. powered base stations and employing a purely battery-operated network of portable devices, an additional problem is presented. Since there is no longer a "master controller" or A.C. base station, situations may arise wherein oscillation by the originating sensor between an alarm or non-alarm (i.e. "all clear") which often occurs early in a fire might create a system conflict. Oscillation back and forth between alarm and "all-clear" states can result in total chaos, particularly where repeating units are present. A transmission loop might occur, for example, if a sensor detects an initial puff of smoke (prior to commencement of larger, consistent puffs) and a signal is initiated in response thereto to a second or more units. If the sensor during a brief interval between puffs no longer detects the smoke, it might send an all-clear signal back to the next units. The second or next unit would send the signals (alarm or all-clear) back to the first, which would send it back again and so forth until the batteries run down. This causes oscillation between alarm and non-alarm states, thereby running down the batteries and reducing detector lifetime. Furthermore, intermittent activation and deactivation of alarms due to oscillation conditions is undesirable, in that it suggests to the public who rely on the system for prompt and accurate detection that the system is either malfunctioning or simply unreliable. Further, the problem remains as to how to effectively transmit, receive, and control RF signals of a relatively long duration among a plurality of battery-operated sensors while avoiding multiple conflicting signals without depleting the finite battery power of the devices.

In light of these and other problems associated with the prior art, it is desirable to have a network of battery-powered sensors operable without the need of a base station to effectively communicate over a wireless RF communication scheme the occurrence of an emergency condition so that personnel located remotely from the alarm condition may be notified. It is also desirable that the detector system be operable with a number of different types of sensing devices to indicate various alarm or emergency conditions and include an associated priority scheme for prioritizing various conditions to most effectively alert the users to such conditions.

SUMMARY OF THE INVENTION

It is an object of the present invention to provide an improved security system comprising any combination of battery powered sensors/detectors interconnected through a wireless CSMA network using radio signals. It is a further object of the invention to provide a wireless, battery-operated detection system of a plurality of RF-interconnected detectors operable over a CSMA-type network and intended to detect the occurrence of a local phenomena and transmit at least one signal to at least one other detector to remotely sound an alarm, each detector operable in a plurality of modes including standby, alarm, test, reset, auxiliary and wait, each detector having a sensor for sensing said local phenomena, a transmitter for transmitting amplitude modulated RF messages indicative of the phenomena, a receiver for receiving the RF messages, alarm means for sounding an audible alarm indicative of the phenomena, and a controller operable to control the mode of operation of each detector, each controller operable to control all the detectors in the system in response to a stimulus and to control multiple and conflicting signals transmitted among said detectors. The controller includes prioritization means for determining the relative priority of the received RF signals and stimuli indicative of a particular condition to enable the appropriate mode of operation; and timer means responsive to the detector operating mode for enabling the transmitter to transmit RF messages immediately after the receiver no longer detects incoming message activity. The receiver is sensed at a randomized time interval to reduce the probability of multiple simultaneous transmissions.

BRIEF DESCRIPTION OF THE DRAWINGS

The invention is to be explained in more detail below based on embodiments depicted in the following figures where:

FIG. 2A is a description of the modes of each detector.

DETAILED DESCRIPTION OF THE INVENTION

Figure 1:
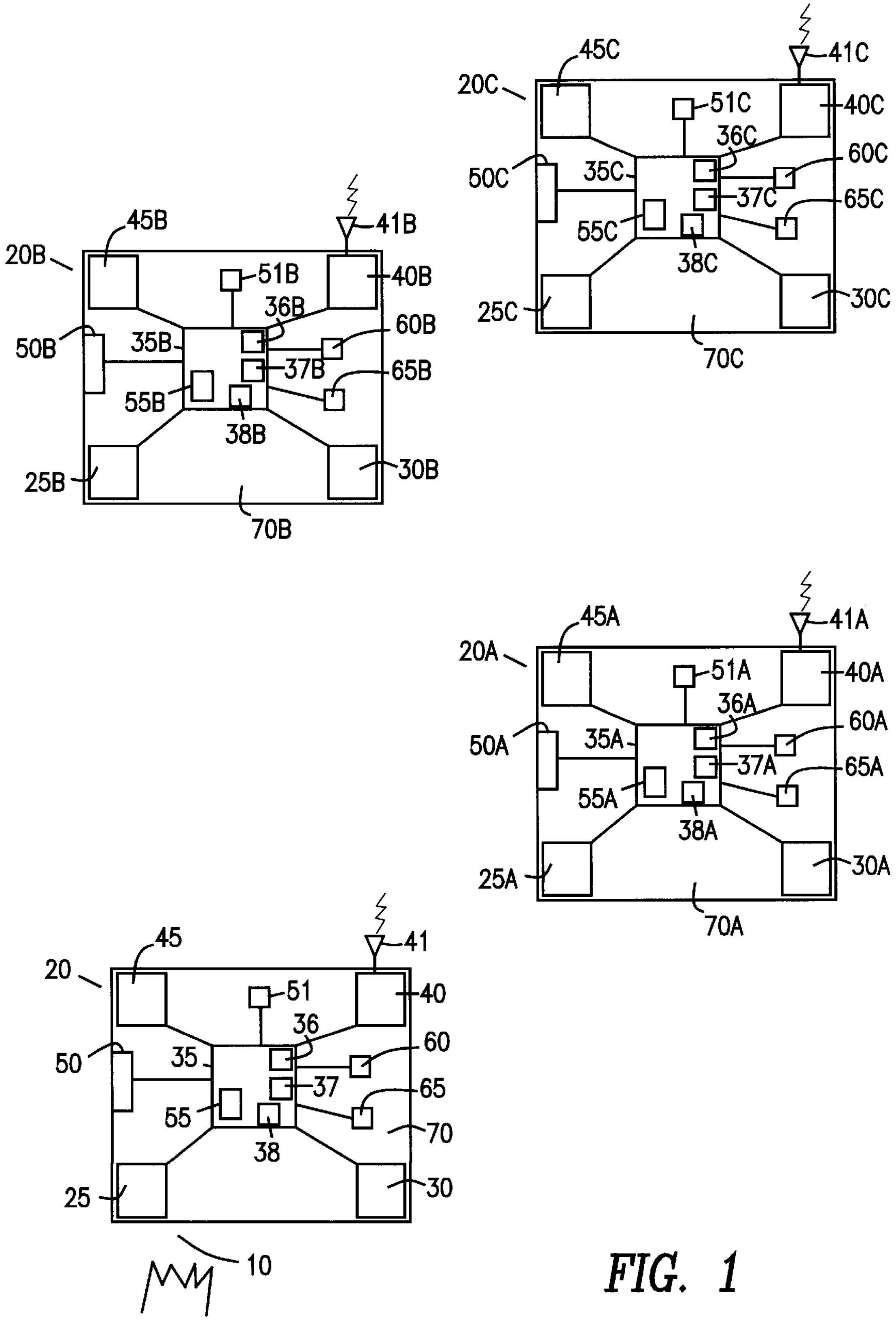
FIG. 1 is an exemplary diagram depicting a detector system of the present invention.

Referring to FIG. 1, there is shown a detection system 10 of the present invention. For exemplary purposes, a four detector/sensor system is shown and its operation described. However, any number of two or more detectors may comprise the system, which is not limited to detectors of the same type (e.g. smoke detectors). Rather, the system may be an "integrated" system comprising battery-operated multiple detector types, including smoke, fire (i.e. flame), heat, gas, photoelectric, carbon monoxide, motion, and intrusion detectors interconnected through a wireless local area network (LAN) of radio frequency signals.

As shown in FIG. 1, the system of the present invention includes a plurality of detectors. Each detector 20, 20A–C includes a local sensor 25, local alarm 30, controlling means 35, RF transmitter 40, and RF receiver 45. Each detector further includes a battery 50 for powering the detector, identification means 55, timer means 36, latch means 37, and prioritization means 38 within controlling means 35, reset means 60 for resetting the individual detector as well as the entire system, and test means 65 for initiating a system test, all enclosed within a protective housing 70. Each detector 20,20A–C is operable in a variety of modes, with each mode corresponding to a particular condition. A number of mutually exclusive modes of operation are defined for detector 20 in the present invention, and include: Standby; Alarm; Low Battery; Reset; Test; AUX2; AUX3; and Wait mode. In the preferred embodiment, a mode entered as a result of a stimulus occurring at the location of the particular detector is called a local mode, whereas a mode driven by receipt of an RF message transmitted from another detector unit is a remote mode. The Standby mode of operation is entered when battery power from 9 Volt DC battery 50 is applied to detector 20. Detector 20 will remain in Standby mode until an external stimulus (e.g. smoke) is applied or the depletion of battery power causes a transition to another mode of operation.

Before a detailed description of each of the modes is given, a general understanding of the nature of the invention is deemed appropriate. Referring again to FIG. 1, the local sensor 25 of the first detector 20 senses an alarm condition such as smoke within the range of its sensor and causes an electrical signal to be applied to controller means 35. In the preferred embodiment, the controller means 35 includes a custom application specific integrated circuit (ASIC) chip for controlling all of the timing and messaging occurring throughout the detector 20. The reset means is a push button switch for initiating a reset command signal to the controller. The test means is also a push button activated switch for generating a test command signal to the controller. In Standby mode, controller means 35 periodically senses its input line connected to sensor 25 to determine if an alarm condition has occurred. In Standby mode, controller means also periodically activates its receiver to determine if any signal data transmitted from another detector is present for reception and decoding. In response to the electrical signal from sensor 25 indicative of a smoke or "alarm" condition, controller means 35 causes the detector 20 to enter Local Alarm mode and activate the alarm 30, thereby sounding a horn alarm at the location of the detector. Concurrently, the controlling means also activates light emitting means 51 such as an LED at the "local" detector 20 with a flashing pattern indicative of the alarm condition. The controller then activates the transmitter to immediately transmit an amplitude modulated (AM) RF message to the other detector units (so-called "remote" units) in the system that an alarm condition has occurred. After transmission of the "alarm" message, the controller at the "local" detector (i.e. detector which initially sensed the "alarm" condition) then enables the local receiver to permit reception of any messages from any of the remote detector units. The local detector 20 remains "latched" in local "alarm" mode with its LED and horn active until either the "reset" push button 60 is depressed on the local detector 20, or a "remote reset" message is received over the RF link from a remote detector unit. This "latching" prevents the detector from resetting even after the sensor 25 no longer detects the presence of a local phenomena such as smoke, but rather requires a manual or remote reset signal in order to indicate and transmit an "all clear" signal.

While "local" detector 20 is transmitting the "alarm" message, remote detector units 20A, 20B, and 20C are powered up and in Standby mode, awaiting either receipt of an external message from another (i.e. remote) detector or a local stimulus from which to respond. If remote detector 20A is in operating range of "local" detector 20's RF transmission, then, upon the periodic receiver activation at detector 20A, receipt of the "alarm" message at receiver 45A causes "remote" detector 20A to enter a "Remote Alarm" mode. In Remote Alarm mode, controller means 35A activates alarm 30A, thereby sounding a horn alarm at the location of the detector 20A. Controller means 35A also causes receiver 45A to be sensed at a regular interval. When the receiver is sensed and no further message activity is detected by the receiver, the transmitter 40A is then enabled and the "alarm" message signal transmitted by detector 20 is retransmitted by detector 20A so that any detector units located beyond the range of the original transmission, but within the range of the retransmitting unit 20A, may be activated. In this manner, an area of coverage much larger than a single unit to unit range is achieved. Upon completion of transmission by detector 20A, transmitter 40A is disabled and receiver 45A is reactivated and periodically sampled to permit reception of any messages from any of the other detector units. Detector 20A remains in remote "alarm" mode with its horn active until either the "reset" push button 60A is depressed, sensor 25A detects an alarm condition local to detector 20A, or a "remote reset" message is received over the RF link from a remote detector unit. If an alarm condition local to detector 20A is determined, the controlling means also activates an LED at detector 20A with a flashing pattern indicative of the alarm condition. Thus a flashing LED pattern may be used to indicate the origin of the alarm condition. Moreover, the absence of a flashing LED pattern on a particular detector whose horn is sounding discloses both the alarm condition and that this detector is relaying the alarm condition rather than initiating it.

In similar manner as described above, remote detector units 20B and 20C transition from Standby mode to Remote Alarm mode by the reception of RF signals from either the local detector unit 20 or another remote detector. In one case, detector 20B may be out of range of detector 20 but within range of remote detector 20A. In this case, detector 20B transitions to remote alarm mode upon reception of the retransmitted alarm message signal from detector 20A. Detector 20B then subsequently retransmits the RF signal received from detector 20A for further alarm propagation, while concurrently activating its alarm horn. Detector 20C, on the other hand, may be within range of detector 20B, but out of range of all other detectors. Consequently, detector 20D is activated into Remote Alarm mode by receipt of detector 20C's alarm message retransmission. As is seen from the above description, the overlapping coverage areas of each of the detector units permit broad area coverage and enhance the effectiveness of the overall detection warning system.

Figure 2:
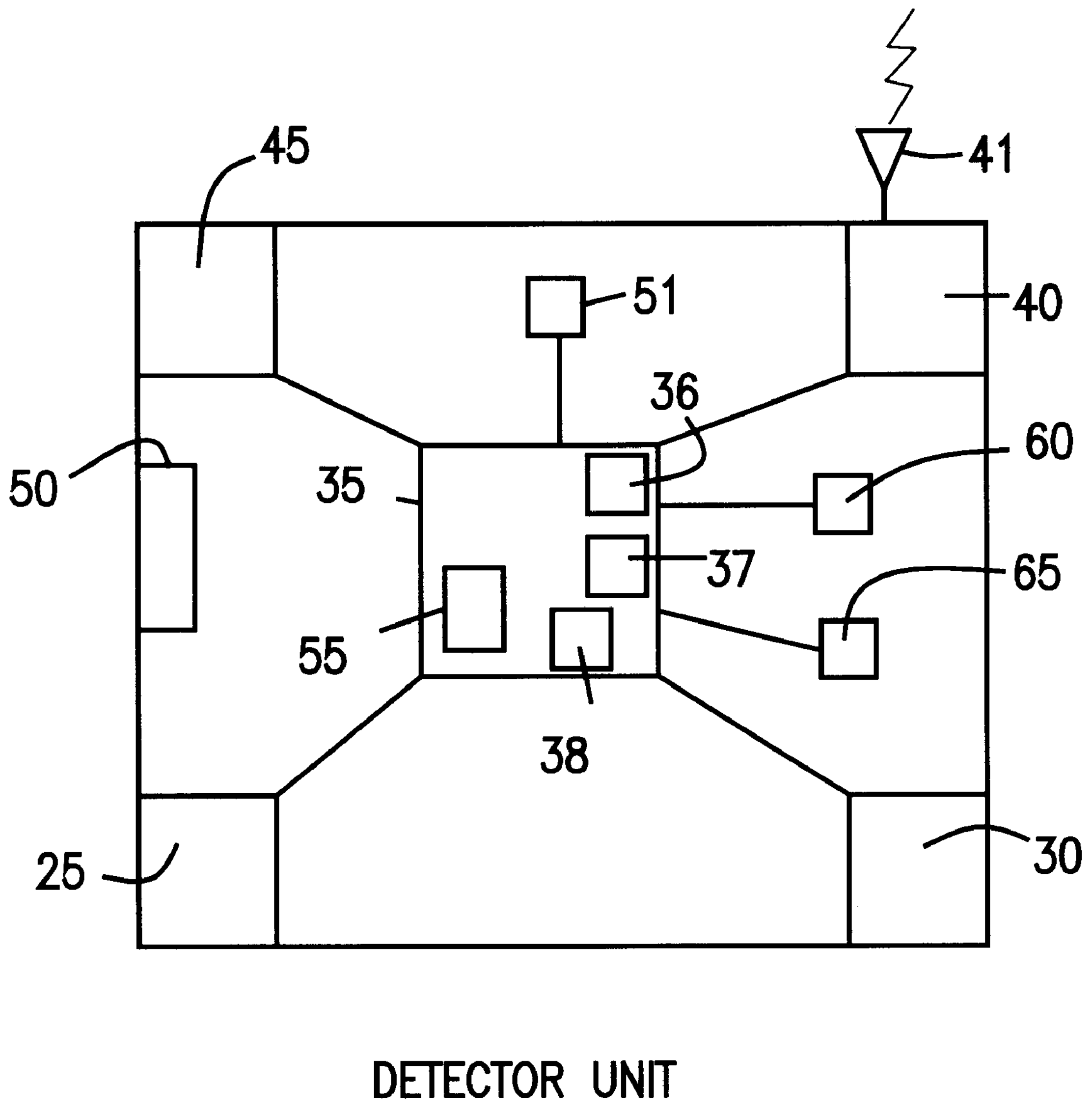
FIG. 2 is an exemplary detailed diagram of a detector of the present invention.

Referring now to FIGS. 1 & 2, a more detailed description of the operation of the detector system and the individual detector components is provided. Smoke detector 20 according to the preferred embodiment is shown in FIG. 1 and operable in each of the modes identified in FIG. 2A. As previously indicated, controlling means 35 is operable to control the smoke detector to transition to a particular mode of operation. The controller means includes the customized ASIC chip 40 and associated circuitry shown in FIG. 3, which enables control of both timing requirements for AM RF transmission and reception as well as mode transition and operation. While AM RF transmission is preferable because of its low cost relative to FM transmission schemes and adequate fidelity for the present purposes, frequency modulated schemes including FM OOK and PSK may also be used to transmit, receive and decode the data messages.

Figure 4:
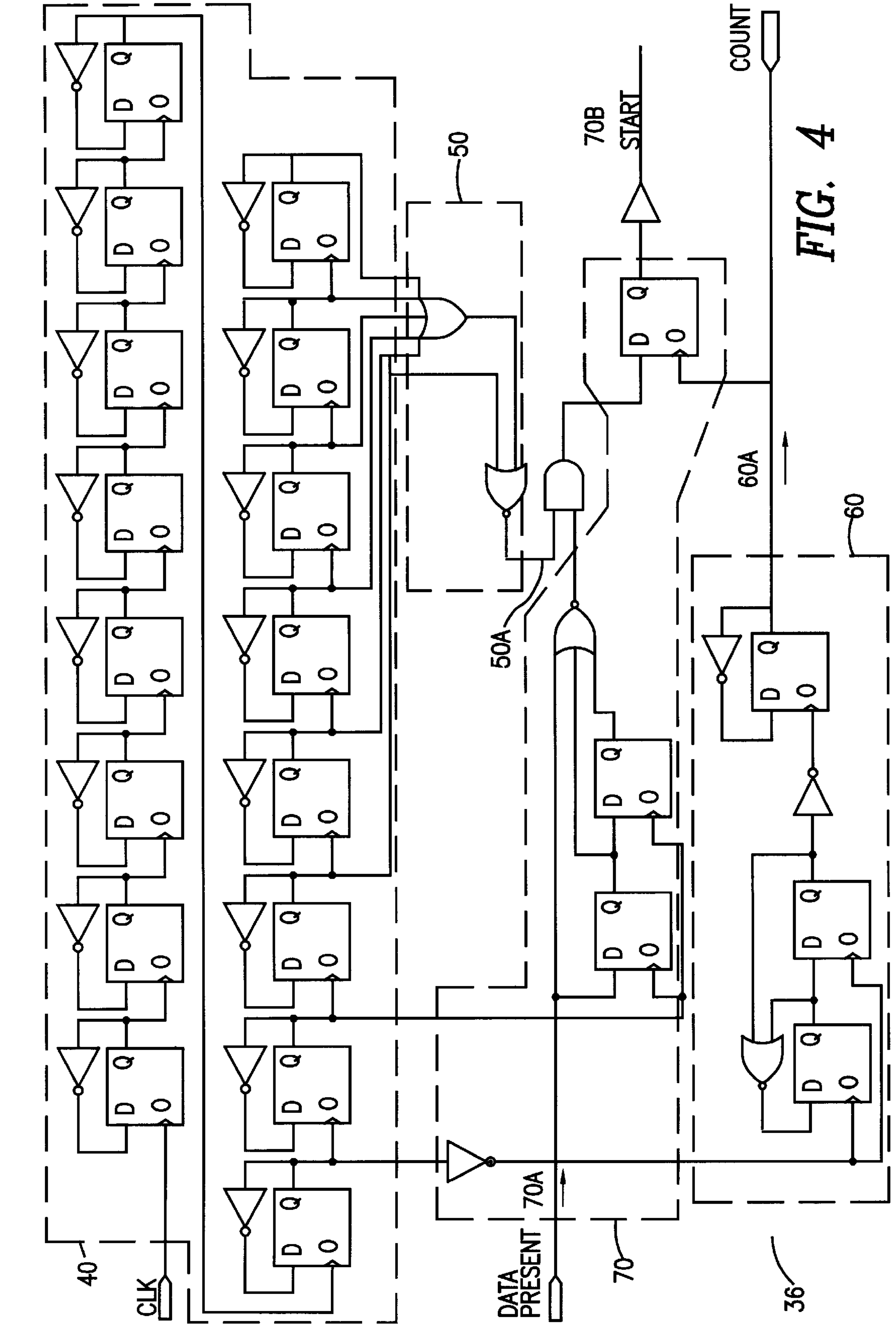
FIG. 4 is an exemplary diagram of the transmission delay circuitry.

Each of the detector units comprising the detector system of FIG. 1 share a common radio channel for signal transmission and reception. To prevent message collisions between detector unit transmissions, a Carrier Sense Multiple Access (CSMA) communication scheme is used. The operation is described as follows. When a detector unit is ready to transmit, it senses the channel by checking the output of its receiver for manchester encoded data. If the unit determines that the channel is idle, RF message transmission is enabled to continuously transmit 16 bit words comprising each message continuously for a period of $T_{tx}$=24 seconds. It is apparent that if two detector units within operating range of one another and a third unit sense the cessation of transmission of the third unit simultaneously, retransmissions are pointless, as both units will transmit simultaneously and their messages will thus collide. To alleviate this problem, each detector employs a holdoff timer 36 shown in FIG. 2 to stagger each unit's sensing of its receiver and, thus, transmission times, to permit effective network communication. Thus, message activity is sensed by testing the output of the receiver for data each time the holdoff timer expires. It is thus desirable for each detector unit to have a different value in its holdoff timer at any given point in time in order to reduce the probability that multiple units will sense a lack of activity simultaneously, thus avoiding multiple simultaneous transmissions. Each unit's holdoff timer is initialized when power is applied to the unit. The holdoff timer may be implemented using conventional circuit devices such as a six-bit ripple counter to provide a uniform random number generator. FIG. 4 shows an exemplary circuit diagram for the holdoff timer for avoiding the multiple simultaneous transmission problem indicated above. The ripple counter 40 comprises logic modules U16–U48. Logic module 50 encompassing gates U1 and U2 decodes the all zeros state to produce a two pulse per second signal 50A. This signal is high on the rising edge of a count signal 60A only one time in three because of the divide by three circuit implemented in U9–U11 of module 60. This produces a Start signal 70B for activating the transmitter up to six (6) seconds after the signal Data Present 70A input to module 70 goes false (i.e. low) indicating no message activity, for at least two pulses from module A. The signal Data Present is the signal sampled at the receiver output. In the preferred embodiment, the holdoff timer increments every $T_{hoi}$=93.75 msec and expires/resets every $T_{hox}$=6 sec. Thus, assuming that the value in any unit's holdoff timer is a random value uniformly distributed over a time interval of from zero to six seconds, the probability that the holdoff timers in any two units are synchronized is simply 1/64, or about 0.016.

Figure 3:
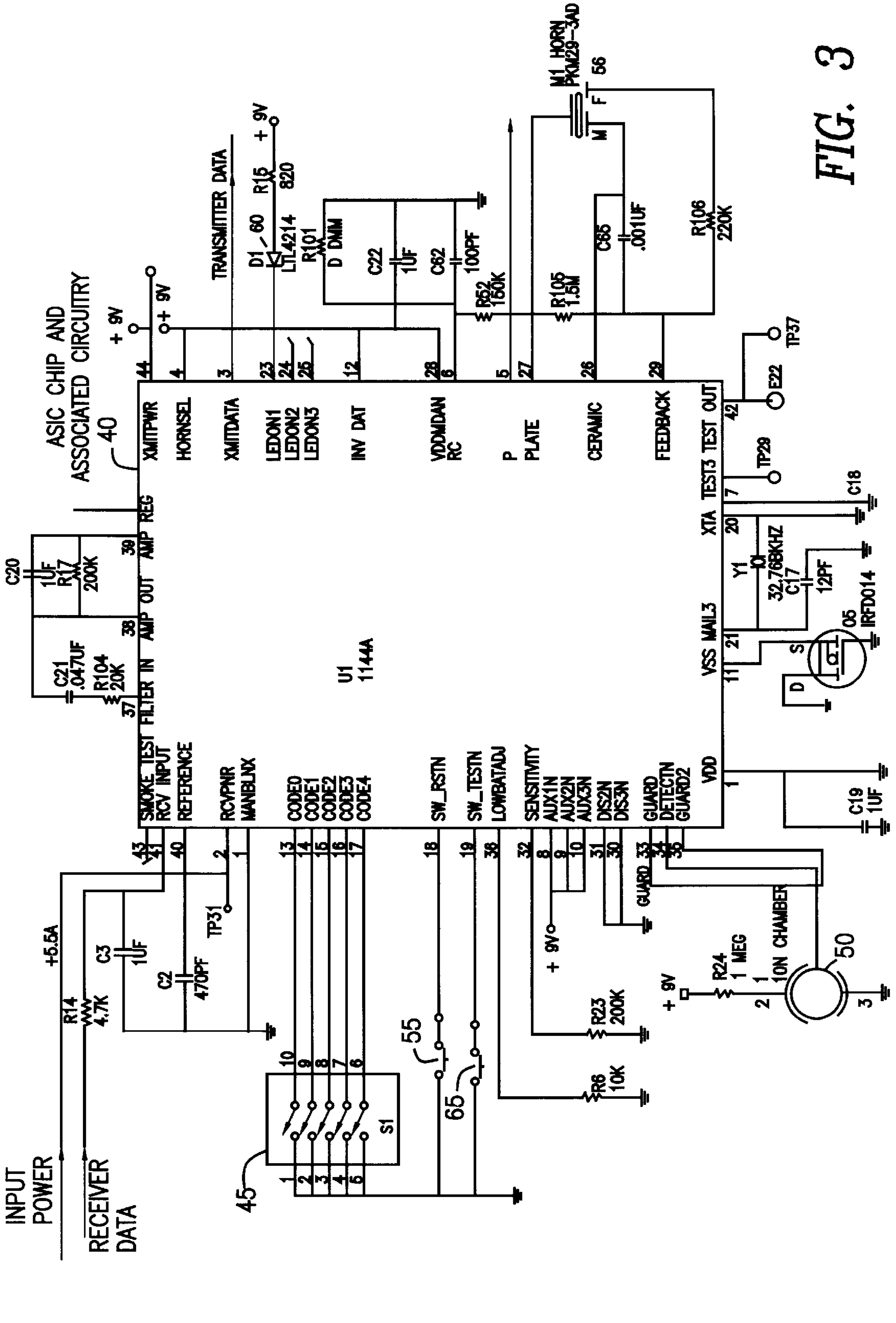
FIG. 3 is an exemplary circuit diagram of the controller chip and associated circuitry.
Figures 4A, 4B:
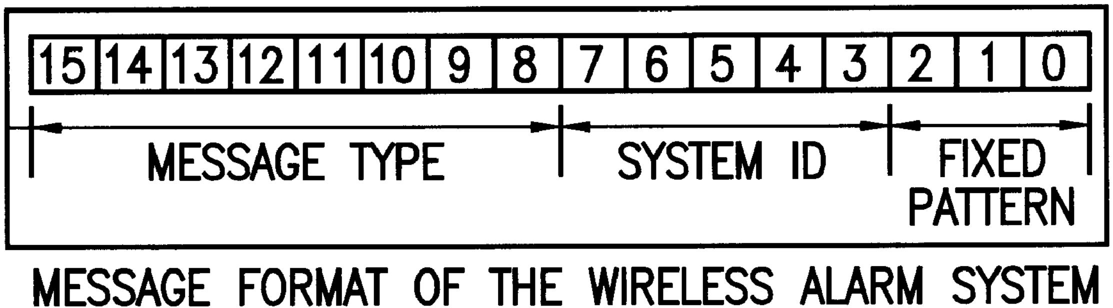
FIG. 4A is an illustration depicting the structure of a transmitted RF message.
FIG. 4B is an illustration depicting the message type bit pattern for each RF transmitted message.
Figure 5:
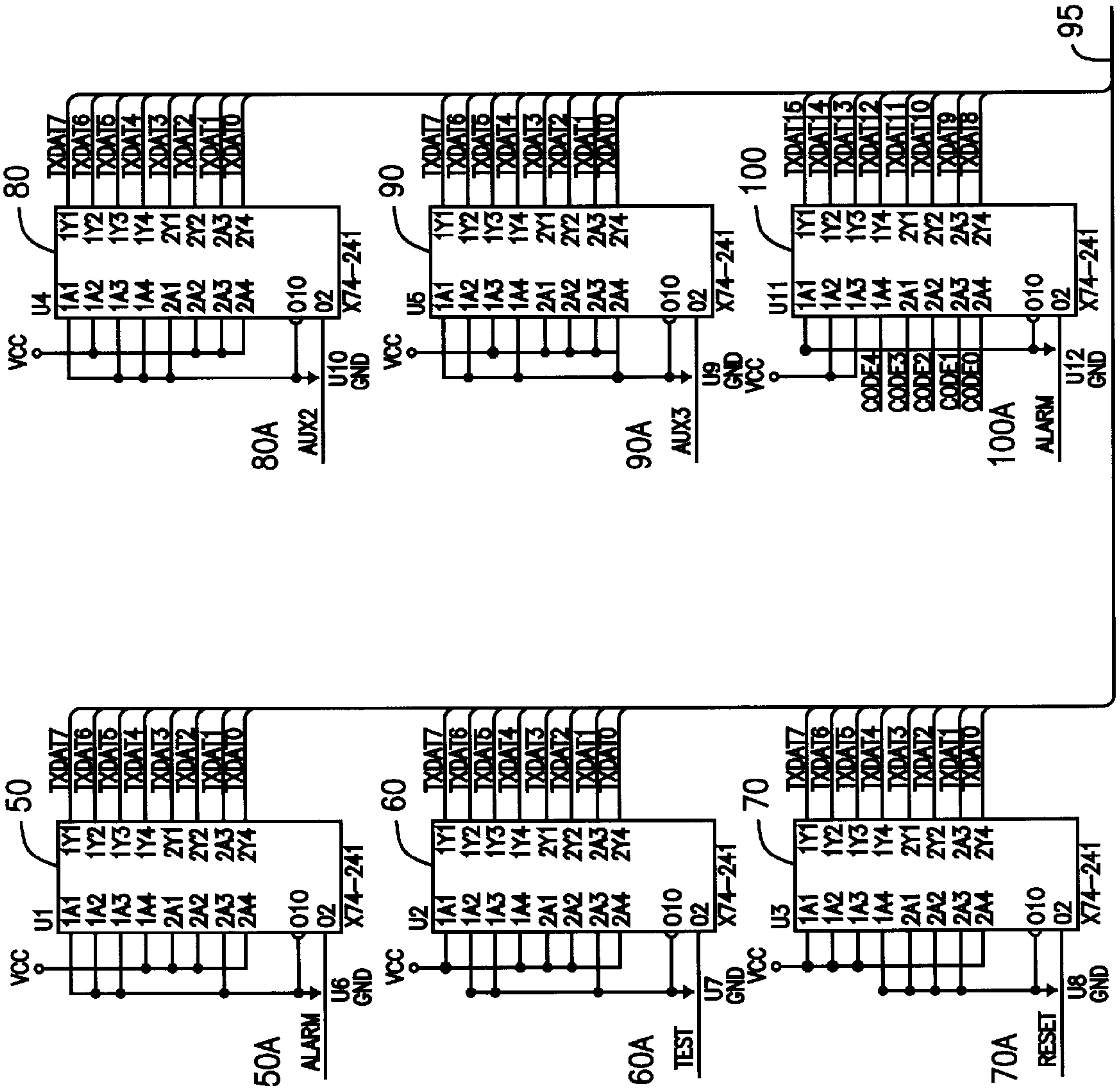
FIG. 5 is an exemplary diagram of the transmitter encoding circuitry.
Figure 6:
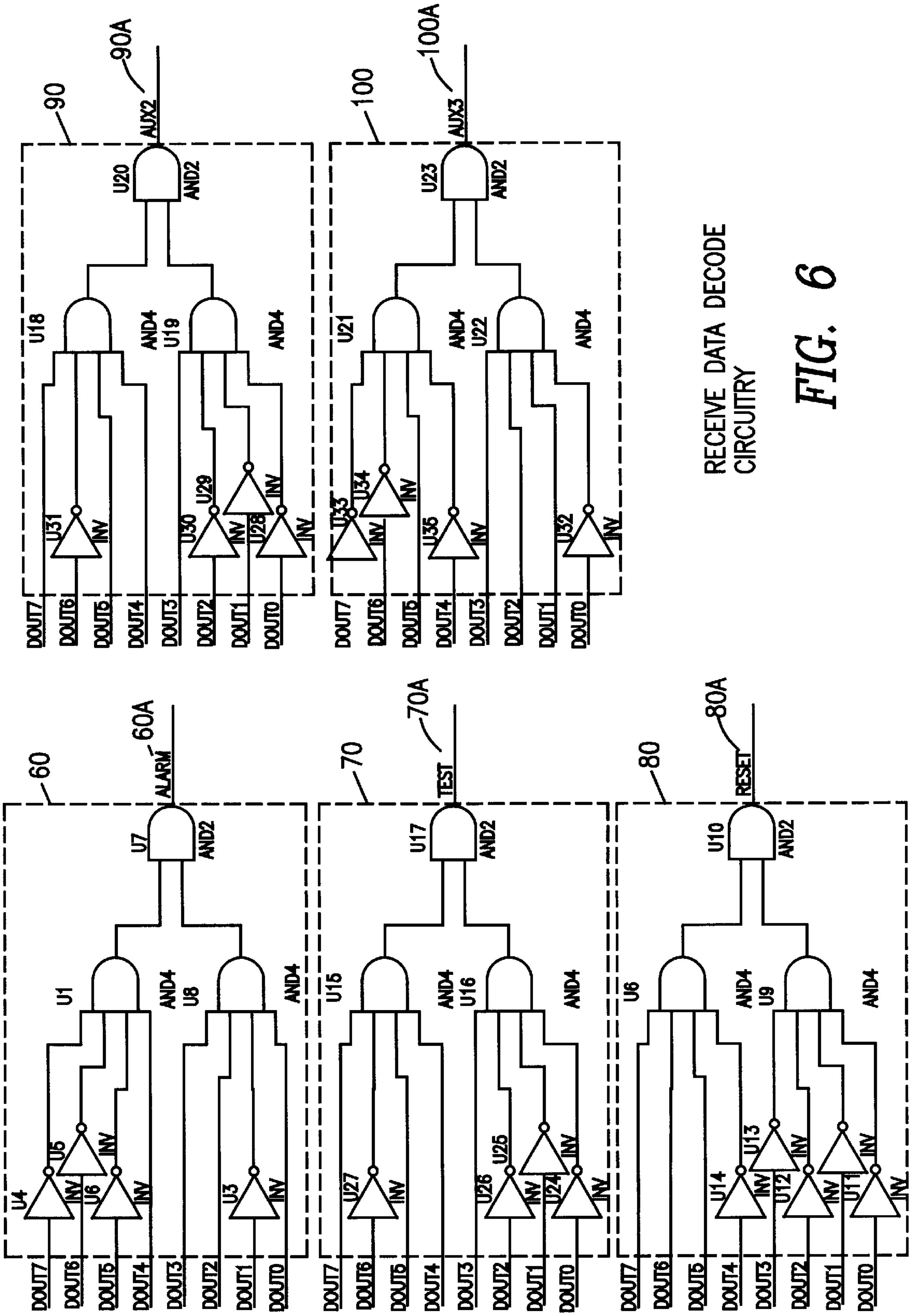
FIG. 6 is an exemplary diagram of the receiver decoding circuitry.
Figure 7:
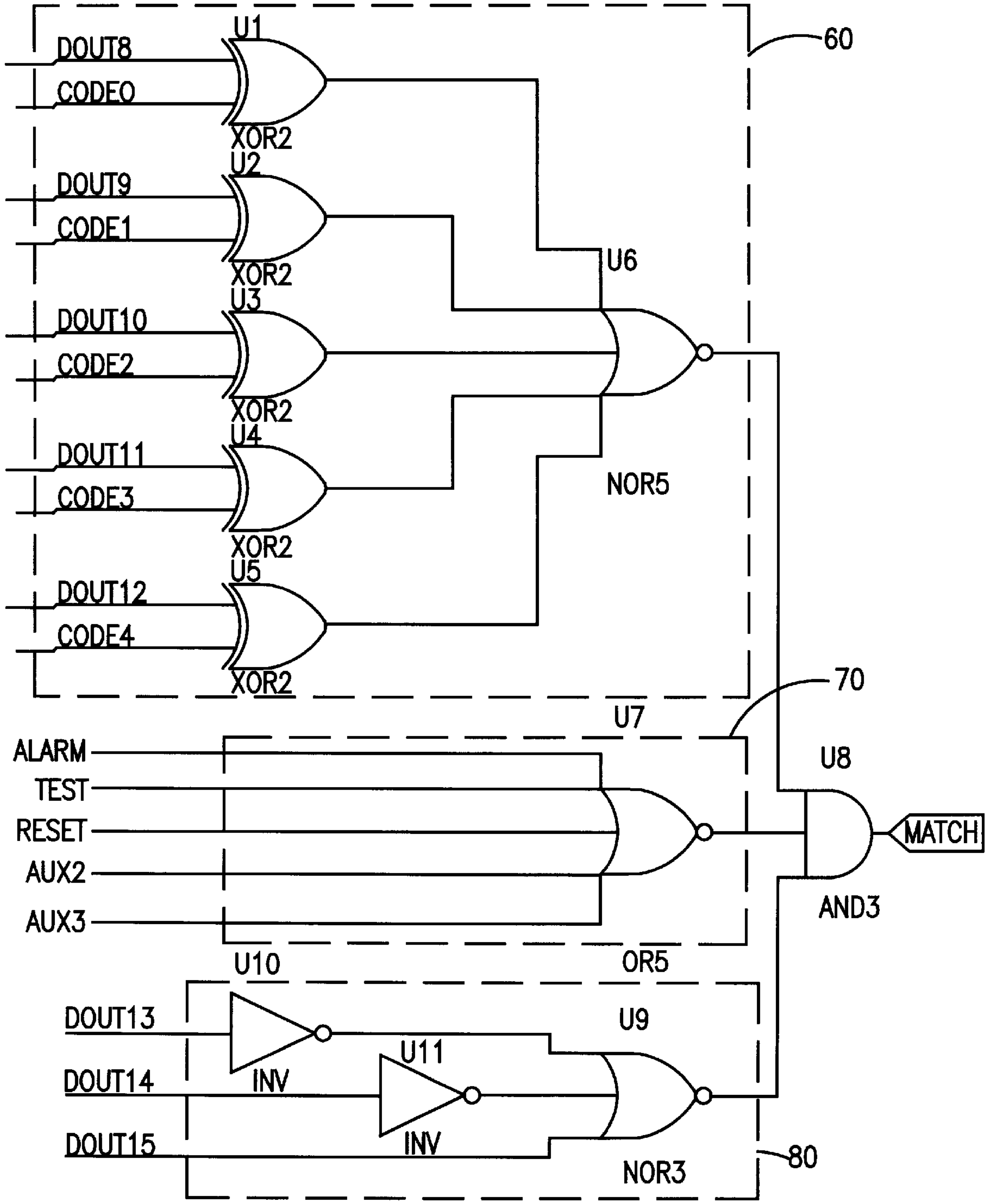
FIG. 7 is an exemplary diagram depicting the data checking circuitry.
Figure 8:
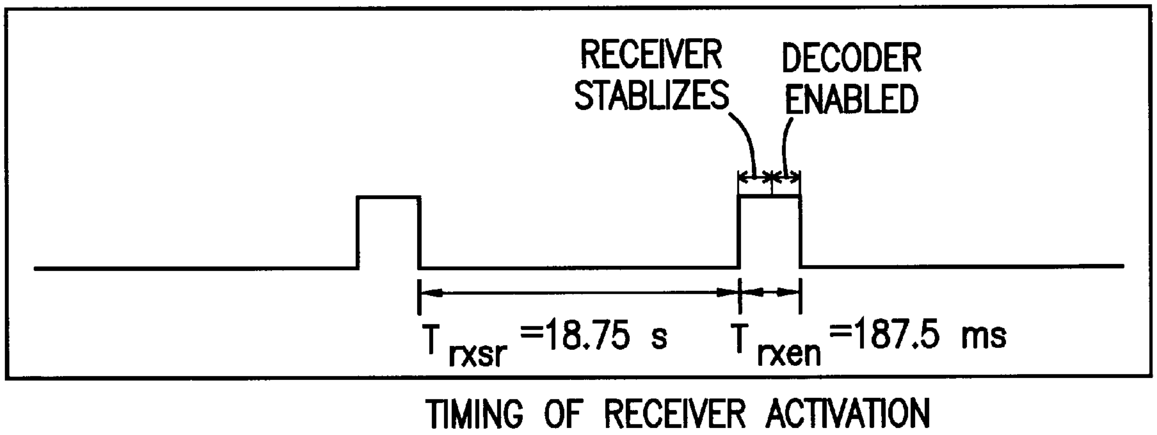
FIG. 8 is an exemplary diagram depicting the timing of the receiver activation and decoding.

In the preferred embodiment, each detector further has associated with it identification means comprising a five position dip switch 45 as shown in FIG. 3. As can be ascertained, up to 32 system identification numbers are available to differentiate among different detection systems which may be operating in close proximity to one another (e.g. a neighbor's alarm system) to prevent RF signal interference and crosstalk among systems. The system of detectors according to the present invention is capable of transmitting RF messages consisting of 16 bit data words at a bit rate of 1024 Hz. Each data word is divided into three subfields, comprising 1) message type; 2) system identification number; and 3) a fixed pattern shown in FIG. 4A. The first eight bits of the data word indicate message type. Multiple message types are defined for transmission to indicate the particular operating mode and include alarm, reset, test, AUX2, and AUX3. The information encoded in each of the data words is stored in memory via conventional means such as EPROM, ROM or other electronic memory means capable of quick retrieval, and also provides flexibility for additional message types for future enhancements. FIG. 4B illustrates the bit patterns for each of these message types. The next five bits of the data word indicate the system identification number described above. The last three bits consist of a fixed pattern (110). Each transmitted message consists of a single word transmitted continuously for a period of twenty-four (24) seconds. Because the detection system of the present invention is wireless and operates on battery power, relatively long transmission sequences are necessary to enable the receiver and decode the data. The transmitter includes conventional circuitry for encoding the six message type functions into eight bit patterns having a low probability of cross detection (i.e. cross correlation). FIG. 5 shows an exemplary circuit diagram for encoding each of the message types into eight bit patterns. Modules 50, 60, 70, 80, and 90 each have an enable input G2 indicative of each particular message type (50A–90A) and multiple inputs coupled to either ground or Vcc potential. Eight bit parallel output lines from each module are coupled together at line 95 for data transmission. The input data bit codes 0–4 for module 100 represent the buffered dip switch 45 inputs from FIG. 3. A load enable signal 100A from the controller means enables coded transmission of output bits at line 90. Individual FETs for ground and Vcc connections may be used to implement the circuit. Each message type is assigned a priority relative to the other message types. In the preferred embodiment, the relative priority (from highest to lowest) is reset followed by alarm, AUX2, AUX3 and test. Each receiver (reference numeral 45 in FIG. 2) further includes conventional circuitry for receiving and decoding the various message types for controller processing, checking the received data to verify that valid messages have been received, and responding according to the priority of the message type(s) received and decoded. FIG. 6 shows exemplary circuitry for decoding the 8 bit data patterns into five message function bits. Input signals Dout0–Dout7 are each input into decoding modules 60–100. Using conventional logic gates, output signals 60A–100A indicative of the particular decoded message type are provided. Each of these outputs are provided as input to the data checking circuitry shown in FIG. 7 to determine if a correct word match has been obtained from the decoded data. As one can ascertain, the function of the circuitry in FIG. 7 is to generate a match signal when the data from shift register bits 8–12 (Dout8–Dout12) match the dip switch inputs code0–code4 (reference numeral 60) AND one of the five message type functions has been decoded (reference numeral 70) AND bits 13–15 (Dout13–Dout15) hold the pattern 110 (reference numeral 80). The controller maintains in memory the number of matches received during a given receiver enable interval. When two or more words having the same defined message type field and system identification number matching the setting of the receiving unit dip switches are consecutively received within the decoding time interval, the message is considered valid. Messages containing words with undefined types, or having system ID numbers not matching the receiving unit dip switches are ignored. FIG. 8 illustrates the timing of the receiver activation window according to the present invention when the unit is in Standby mode. As shown in FIG. 8, when a detector is in Standby mode, its receiver is activated or enabled for a period of $T_{rxen}$=187.5 msec every 18.75 seconds. However, the first half of this interval is reserved to permit the receiver to stabilize. The decoder circuitry is not enabled until the second half of this time period. If no data is present at the receiver, the receiver is then disabled. If data is present, the receiver remains active and is periodically sensed in accordance with the holdoff timer until data no longer is present at the receiver. As one can ascertain from the above illustration, battery power is conserved by periodically enabling the receiver for only a short duration so that it can determine if data has been transmitted.

Figure 8A:
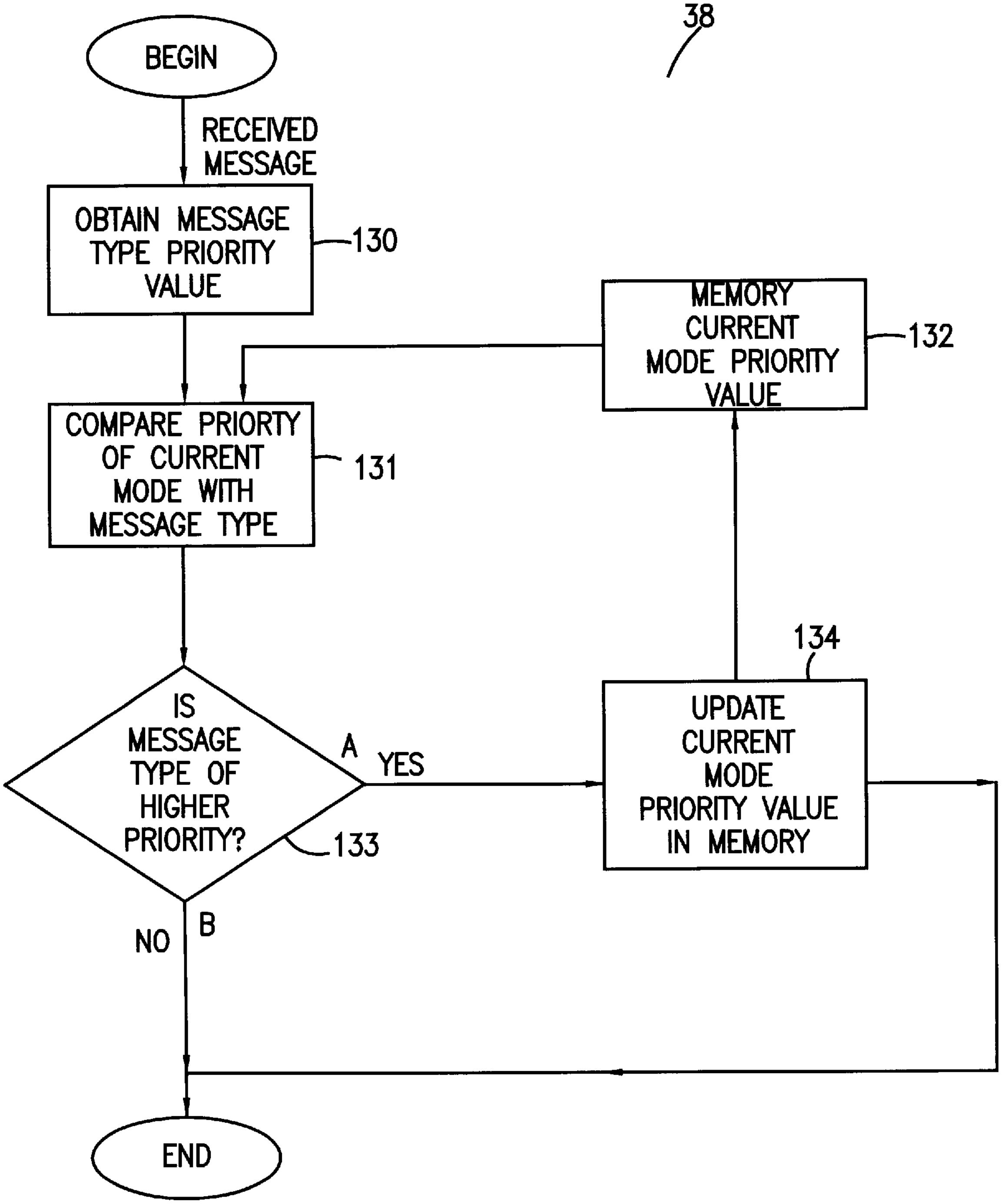
FIG. 8A is an exemplary diagram illustrating the detector unit prioritization scheme of the present invention.

As previously indicated, each message type has a relative priority. Referring now to FIGS. 2 and 8A, the controlling means includes a prioritization means 38 having a memory 132 (FIG. 8A) for storing a value corresponding to the current state or mode of the detector. When a message is received (module 130), the priority value associated with that message is determined. The prioritization means then retrieves the priority value associated with the current mode and compares the stored value with the value corresponding to the received message (module 131). If the received message type has a higher priority value (i.e. higher priority), as shown in path A of module 133, then memory 132 is updated with the priority value associated with that message type (at module 134) and the detector transitions to that corresponding mode. If the received message is of lower priority, as shown in path B of module 133, no memory update occurs and the detector maintains its current mode of operation. For example, if a detector receives a valid transmission of an alarm message followed immediately by a reset message during a receiver enable period, the controller will compare the priority value of the received reset message with that of the current mode (i.e. "alarm") and, because reset is of higher priority, cause the detector to implement reset operations. However, if a detector receives a transmission of an alarm message followed by an AUX2 message during a receiver enable period, the controller will cause the detector to implement and maintain alarm mode operations. As one can ascertain, the prioritization of each of the message types at each detector decreases the number of potentially conflicting signal states transmitted and propagated across the detector network, thereby limiting the likelihood of an oscillation condition between "alarm" and "non-alarm" states across the net.

Figure 2B:
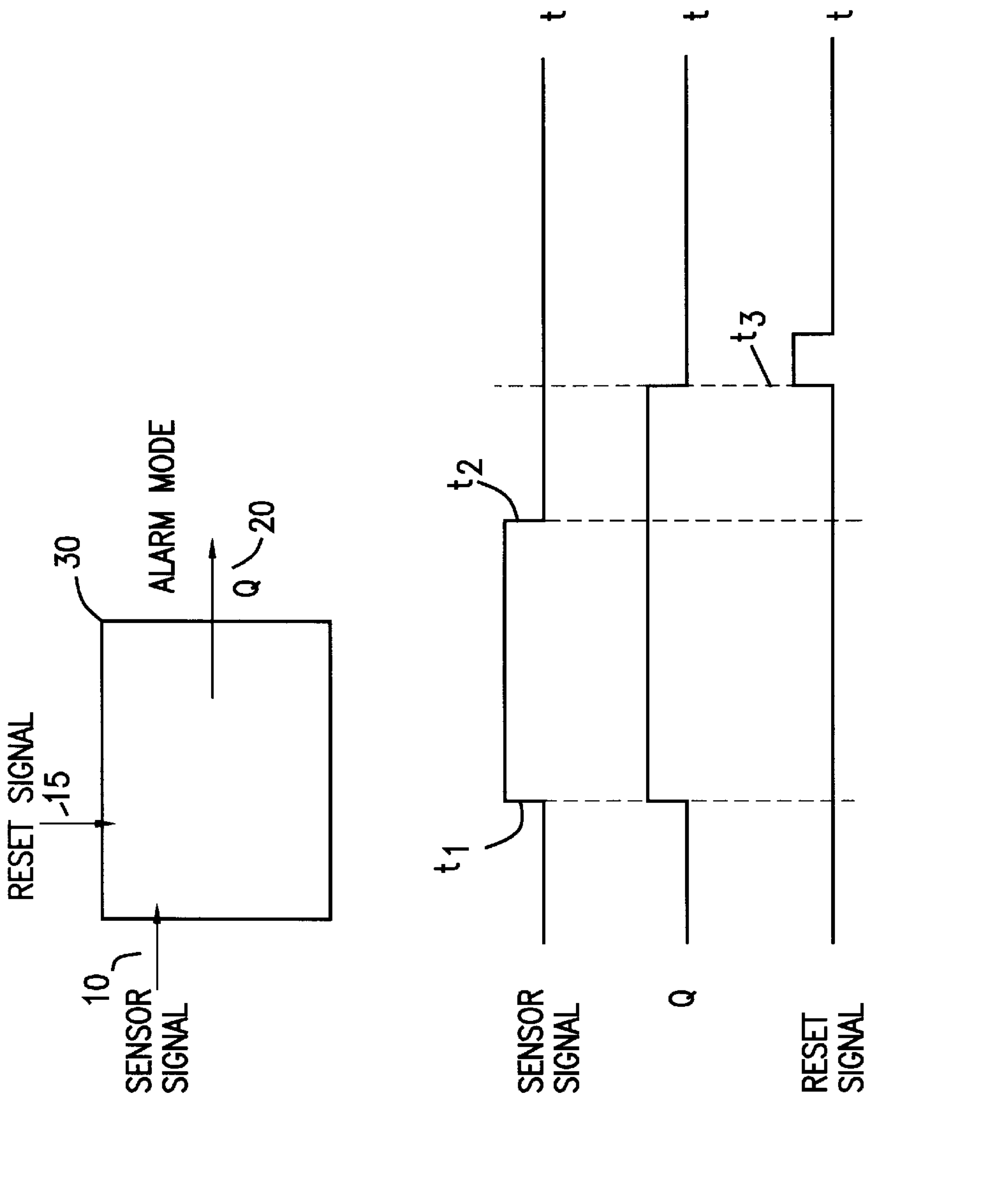
FIG. 2B is an exemplary circuit and timing diagram of the operation of the latched mode.

Referring now to FIG. 3 in conjunction with FIGS. 2, 2A, 2B, each of the modes for controlling the operation of the detectors in the detector system are described. As previously stated, the standby operating mode is initiated by the application of battery power to the unit as indicated by Vdd at ASIC 10 pin 1. The unit will remain in standby mode until an external stimulus or the depletion of the battery cause a transition to another mode. In standby mode, sensing means 50 is sampled periodically at pin 34 to determine if a local phenomena is present. In the preferred embodiment, the sensing means is an ion chamber for detecting the presence of smoke, but may alternatively be a piezoelectric heat sensor, carbon monoxide sensor, motion sensor, or the like. If the ion chamber indicates the presence of smoke, the unit 40 ASIC enters the ALARM mode locally. When ASIC 40 causes the local detector to enter the alarm mode, the detector is then "latched" in this mode by latching means 37 (FIG. 2) until either the reset Button 55 is depressed on the unit, or until a Reset message is received over the RF interface at pin 41. FIG. 2B represents an exemplary circuit and timing diagram of the operation of the latched mode. Referring now to FIG. 2B, the rising edge of sensor signal 10 at time t1 causes the output 20 of flip flop 30 to go "high", indicating the alarm mode of operation. The output 20 remains high even when the sensor signal goes "low" indicative that the sensor 50 (FIG. 3) no longer detects smoke, as illustrated at time t2. However, when reset signal 15 is received (as indicated by a reset signal "high" logic) as illustrated at time t3, the edge triggered signal causes the output 20 to go "low", thereby terminating the alarm mode. The latched alarm (vs. "automatic" resets in other systems wherein cessation of smoke terminates the alarm condition) thus serves to control multiple conflicting signals by providing a steady state which prevents oscillation between alarm and non-alarm ("all-clear") conditions.

Upon initial transition to alarm mode, the receiver (not shown) is sampled at pin 41 for RF message activity. If no activity is found, the receiver is disabled, and the transmitter (not shown) is enabled. The coded alarm message is then transmitted by ASIC 40 at pin 3 in order to activate other detector units within the system of the alarm condition. As previously described, the holdoff timer avoids the problem of multiple units simultaneously transmitting by sensing the receiver after a variable time delay. The first unit to sense that data is no longer detected at the receiver will also be the first to transmit. Since the variable delay is unlikely to be the same in multiple detector units, a single transmitter should transmit first, thereby inhibiting all others. Upon completion of transmission, ASIC 40 re-enables its receiver for continuous activation so that a message from other detectors in the system may be received. Such continuous operation of the receiver as opposed to the duty cycle approach of many other systems ensures that external messages are not missed, so as not to introduce system anomalies, lengthy communication delays, or incorrect state assignments. Concurrent with the transition to local alarm mode, the horn 56 is activated to emit an audible alarm horn pattern indicating smoke detection. ASIC 40 has memory means for storing a variety of alarm horn patterns to indicate various condition types or to comply with various regulatory requests, as will be described later. An LED 60 is also activated at pin 23 with a pattern indicative of the "alarm" condition. ASIC 40 is also operable to vary the LED flash pattern to indicate different alarm or mode conditions. The manner by which to vary an LED flash sequence is well known in the art.

Depressing reset push button switch 55 generates a signal incident to ASIC 40 at pin 18 to cause the detector to enter Reset mode. Reset mode is entered remotely upon reception of an RF reset message at pin 41. When either of these events occur, the horn 56 and LED 60 are disabled and the ASIC then transitions into a Wait mode. If, however, ion chamber 50 indicates the presence of smoke while in reset mode, the alarm mode is re-entered and the horn and LED are reactivated. When no local phenomena is detected after a reset indication is received, the detector remains in Wait mode for a predefined time interval before transitioning to the Standby mode. While in wait mode, ASIC 40 disables the receiver to prevent continuous retransmission of any Reset or Test messages. Disabling the receiver during the wait state thus provides further signal control for minimizing conflicting signal commands while allowing existing RF transmissions to propagate to all detectors in the system to achieve steady state.

Depressing test button switch 65 generates a signal incident to ASIC 40 at pin 19 to cause the detector to enter Test mode. Test mode is entered remotely upon reception of an RF test message at pin 41. When either of these events occur, the horn 56 is activated with an audible pattern indicative of the Test mode. In either local or remote Test mode, the transmitter is enabled and, after a variable time delay, activated to transmit (retransmit for remote mode) an RF test message to other detector units. Upon completion of the transmission sequence, the ASIC 40 then causes transition into the Wait mode for a predefined time interval before transitioning to the Standby mode.

As one can ascertain, receipt of a valid RF signal transmission at pin 41 causes ASIC 40 to enter modes remotely. Remote Reset mode is entered upon receipt of a Reset message as described above. Remote Alarm mode is entered as a result of an Alarm message. Remote Test mode is entered upon receipt of a Test message, while Remote AUX modes are entered as a result of receiving AUX2 or AUX3 messages.

When ASIC 40 causes transition to Remote Alarm mode, the detector will remain in this mode until another message of higher priority is received or a reset button is depressed or battery depletion causes transition to another mode. After receiving the remote alarm message, the receiver is sampled until no further activity is detected. If a Reset message is received before an absence of message activity is detected, ASIC 40 causes the detector to enter Remote Reset mode. If, however, no reset message is detected, the receiver is then disabled, and the transmitter enabled to begin retransmission of the alarm message to other detectors in the network. As described in the alarm mode, the receiver is sensed after a variable time delay according to the detector holdoff timer value to maintain a low probability of network signal collision. When no data is sensed, the transmitter is then activated. Upon completion of transmission, ASIC 40 re-enables its receiver for continuous activation so that a message from other detectors in the system may be received. Concurrent with the transition to remote alarm mode, the horn 56 is activated to emit an audible alarm horn pattern indicating smoke detection. In the preferred embodiment, the LED is not activated in this mode unless the ion chamber 50 indicates the presence of smoke. When this occurs, ASIC 40 will cause the LED to be activated with the Alarm LED pattern.

Figure 8B:
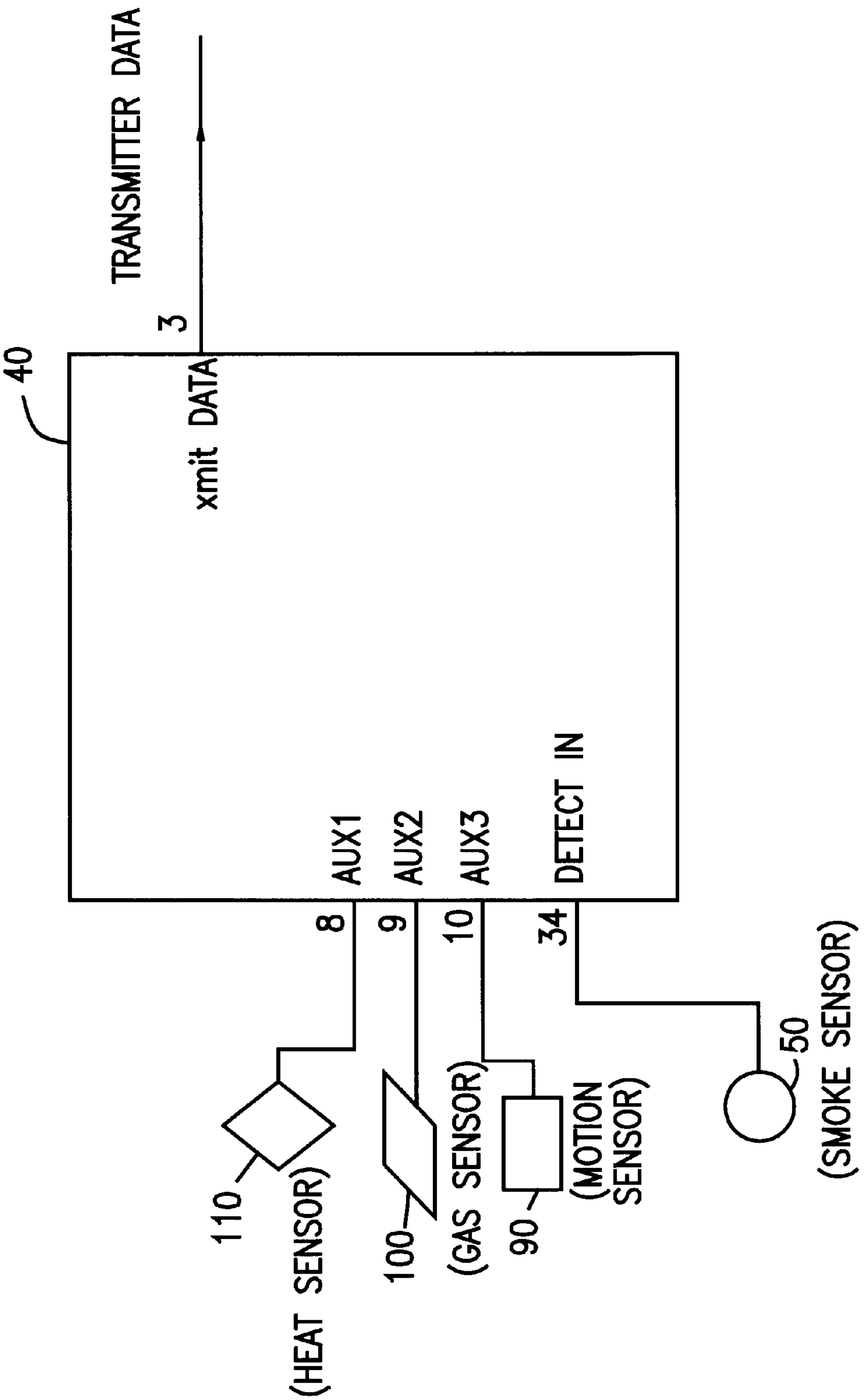
FIG. 8B is an exemplary diagram illustrating a detector having multiple sensor types connected to a single detector unit ASIC.

When ASIC 40 causes transition to one of the auxiliary modes (i.e. AUX2 or AUX3), the detector will remain in this mode until another message of higher priority is received, phenomena at the location of the sensor is indicated, or until a reset push button is depressed or battery depletion causes transition to another mode. After receiving an auxiliary message, the receiver is sampled until no further activity is detected. In the preferred embodiment, two auxiliary messages (AUX2 or AUX3) are available for reception. Auxiliary modes are thus operable to indicate other emergency or alert conditions which may have different priority to alert personnel to its occurrence than the alarm condition associated with the alarm mode. For example, the AUX2 message may be used in conjunction with a carbon monoxide sensor to transmit a "gas emergency" condition, while a motion detector may utilize an AUX3 message at its sensor to transmit a "motion emergency" condition. Other uses of the auxiliary modes and message types are contemplated, such as for identifying varying degrees of the same sensor condition indicative of relative safety levels or communications with peripheral devices, and are considered within the scope of the invention. The system of the present invention also contemplates and is readily adaptable to handle either additional types of sensor devices and associated message priority types as well as multiple sensor types within a given detector. For example, referring to FIG. 3, another sensor may be connected to pin 8 (AUX1 shown connected to Vcc) such as a photoelectric, heat, or flame sensor along with a corresponding message type and priority to be stored in memory. Similarly, pins 30 and 31 (DSN2 and DSN3 shown connected to ground) may be used as negative voltage device drivers. As one can ascertain, the architecture thus permits a given detector to have multiple sensors, where each sensor is coupled to a corresponding pin on ASIC 40 to enable local detection of multiple emergency conditions. FIG. 8B represents a detailed view of FIG. 3 modified to illustrate a detector having multiple sensor types. In this figure, smoke sensor 50 is coupled at pin 34 for transmitting a first priority alarm message indicating smoke detection at transmitter data output pin 3. Heat sensor 110 is coupled to pin 8 for transmitting a second priority AUX1 message indicating excessive heat detection. Gas sensor 100 is connected to pin 9 for notification of a third priority gas condition and subsequent transmission of an AUX2 message, while motion sensor 90 is coupled to pin 10 so that a fourth priority AUX3 message indicating motion detection may be transmitted over output pin 3. As one can ascertain, the system and architecture of the present invention provides both flexibility and adaptability in configuring a system to meet the detection requirements for various users.

Figure 7A:
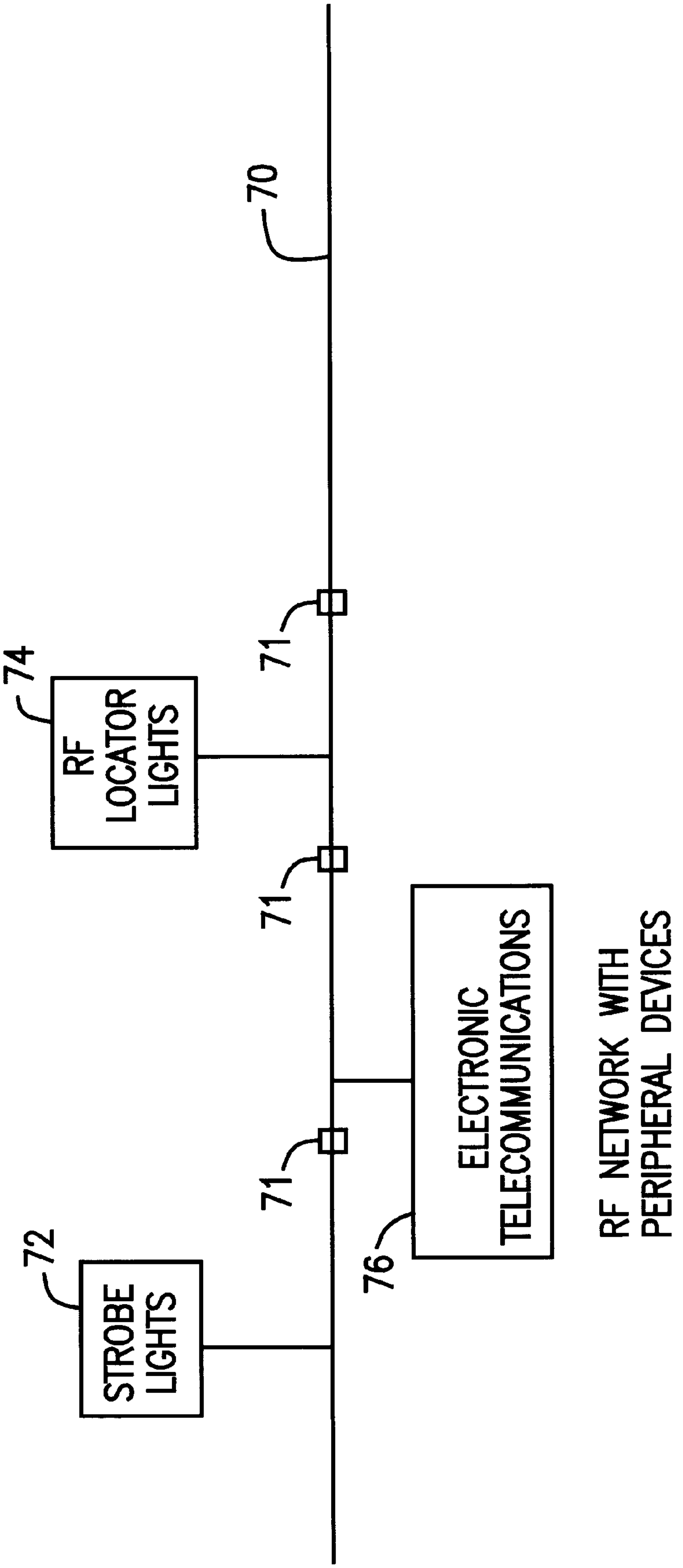
FIG. 7A is an exemplary diagram depicting an RF network of detectors and peripheral devices.

Referring again to FIGS. 1 and 3, if a reset message is received before an absence of message activity is detected at the receiver, ASIC 40 causes the detector to enter Reset mode remotely. If, however, no reset message is detected, the receiver is then disabled, and the transmitter enabled to begin transmission of the auxiliary message to other detectors in the network. As previously described, the receiver is sensed after a variable time delay according to the detector holdoff timer value to maintain a low probability of network signal collision. Upon completion of transmission, ASIC 40 re-enables its receiver for continuous activation so that a message from other detectors in the system may be received. Concurrent with the transition to auxiliary mode, the horn 56 is activated to emit an audible alarm horn pattern indicative of the AUX2 or AUX3 mode. As shown in FIG. 7A, these auxiliary modes of operation and corresponding auxiliary messages may be used to provide additional commands or status to enable peripheral devices that may be connected to the RF network 70 of detectors 71 such as strobe lights 72 for the hard of hearing, locator lights 74 for identifying locations to police, fire, and medical personnel, or electronic and telecommunications devices 76 including phone dialers, cable TV boxes, or personal computers which may be programmed to receive such messages and activate the desired equipment.

A Low Battery mode is also provided to indicate a low battery power detector condition. ASIC 40 periodically samples the battery voltage when the LED is on during each of the above modes to determine if the voltage exceeds a predetermined threshold. In the preferred embodiment, the low battery threshold voltage is approximately 7.0 volts: If the sampled voltage does not exceed the threshold, ASIC 40 causes the detector to transition to Low Battery mode and emit an audible horn pattern indicative of the low battery condition. Since periodic voltage sampling continues in the Low Battery mode, a detector may briefly transition from this mode back to other operating mode due to temporary voltage fluctuations/increases. As the battery voltage continues to decrease, the unit will eventually remain in low battery mode until the battery is completely depleted or replaced.

In the preferred embodiment, horn patterns indicative of alarm, auxiliary, test, and low battery states are provided. The alarm/horn pattern may be varied through minor adjustments of circuit components as well as enabling different pin connectors on ASIC chip 40. For example, a first alarm/horn pattern may be applied to the horn during alarm conditions if the HORNSEL strap (pin 4 of FIG. 3) is connected to +9v VDD. A second alarm/horn pattern may be provided by connecting the HORNSEL strap to negative voltage VSS. Similarly, an auxiliary horn pattern can be applied by varying the voltage supplied to the horn 56 to change either the frequency of the horn or the pitch, or both.

In this manner, various horns of varying patterns indicative of multiple events or conditions are easily provided. LED flash patterns and multiple LEDs can be included and varied in an analogous way to indicate multiple alarm or event conditions. ASIC chip 40 also provides additional pin connections such as terminals 24 and 25 to accommodate multiple LEDs indicative of different emergency conditions, as well as integrated circuitry to accommodate enhancements, such as DSN terminals 30 and 31, and AUX terminals 8–10 as previously described.

Figure 9A:
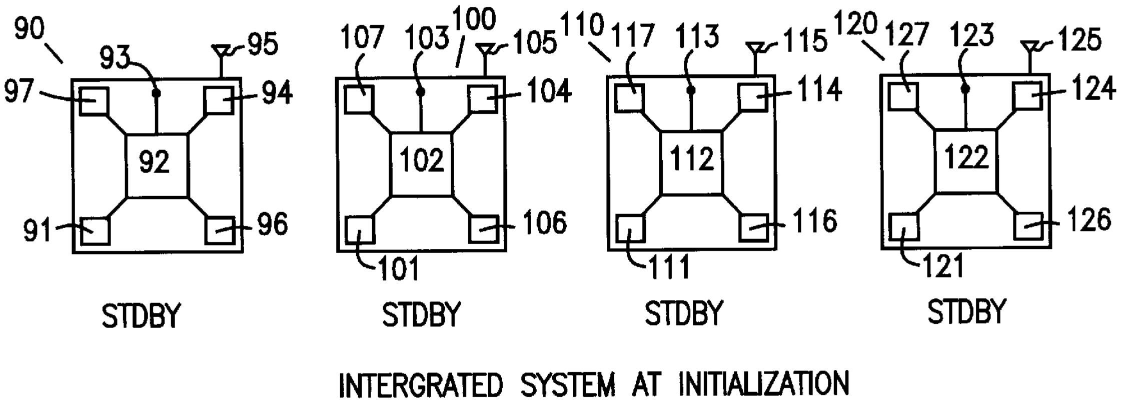
FIG. 9 is an exemplary diagram depicting an integrated network of different detector types.
Figure 9B:
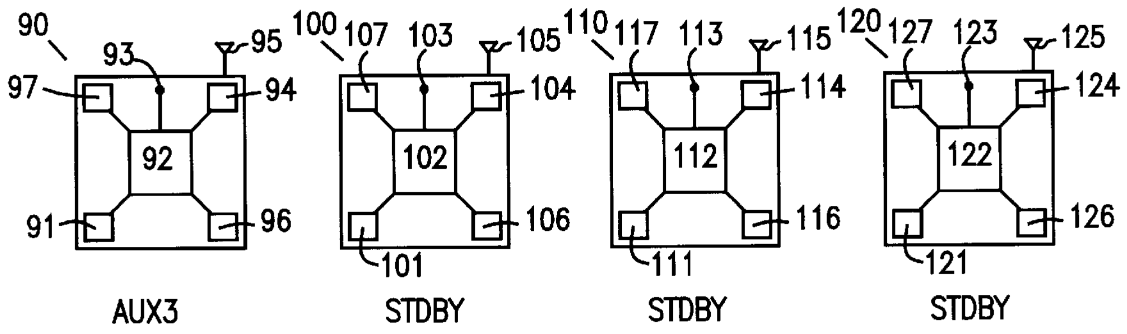
Figure 9C:
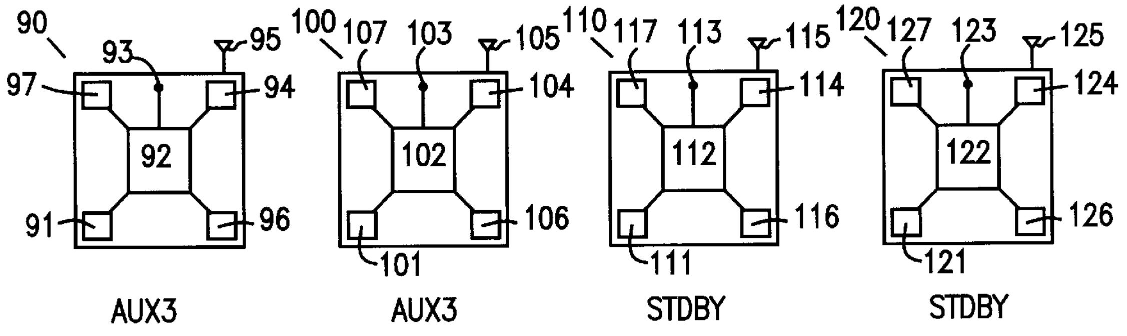
Figure 9D:
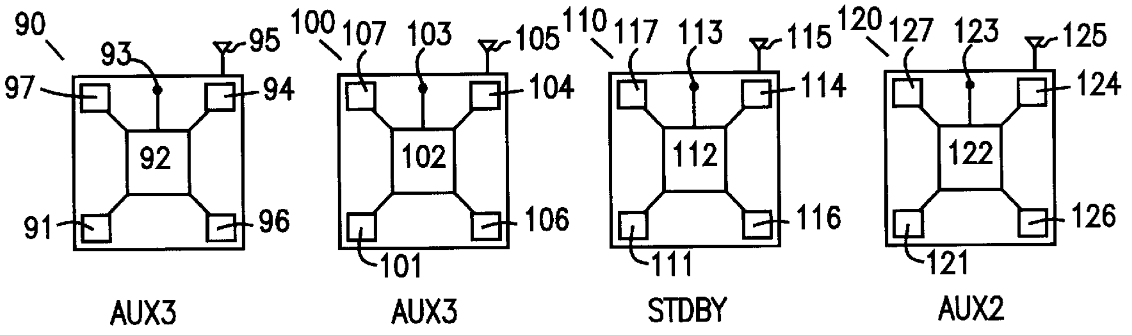
Figure 9E:
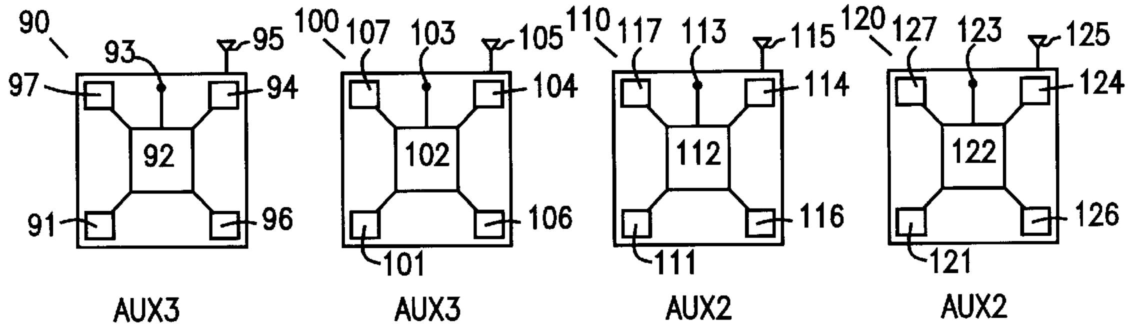
Figure 9F:
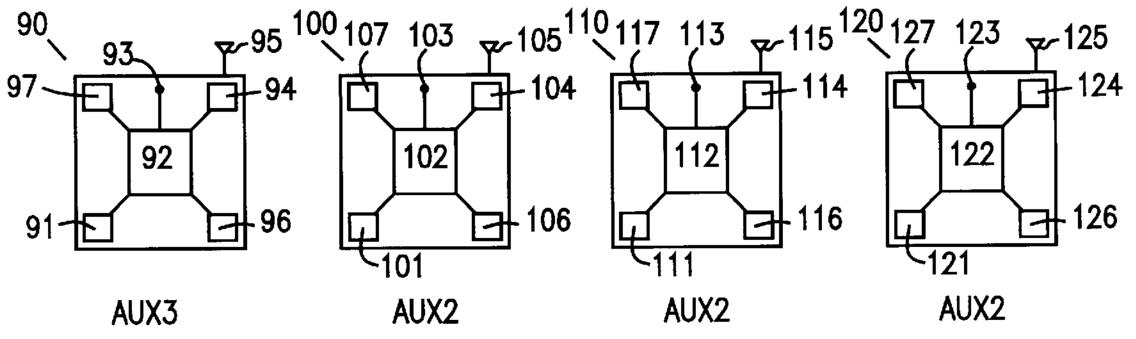
Figure 9G:
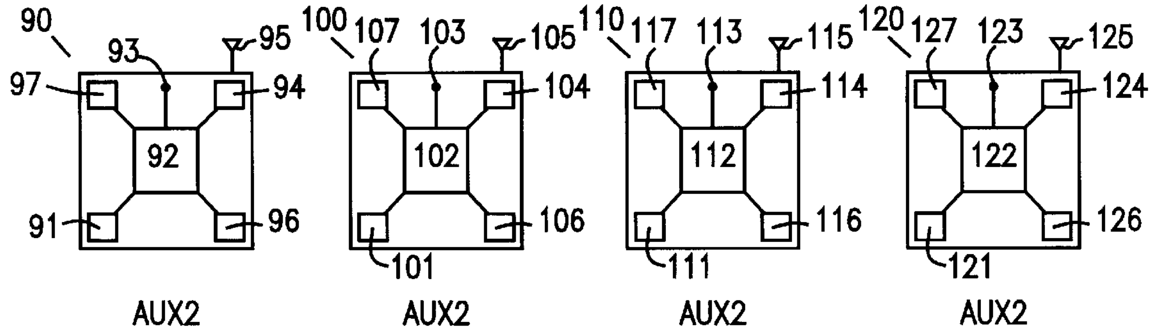
Figure 9H:
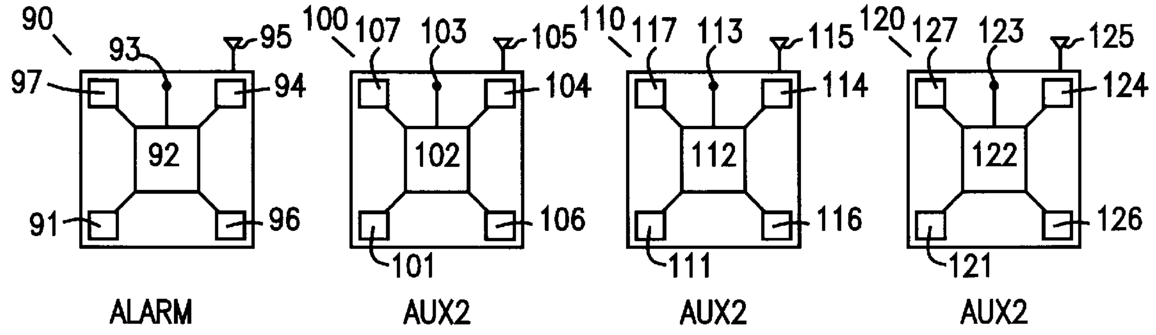
Figure 9I:
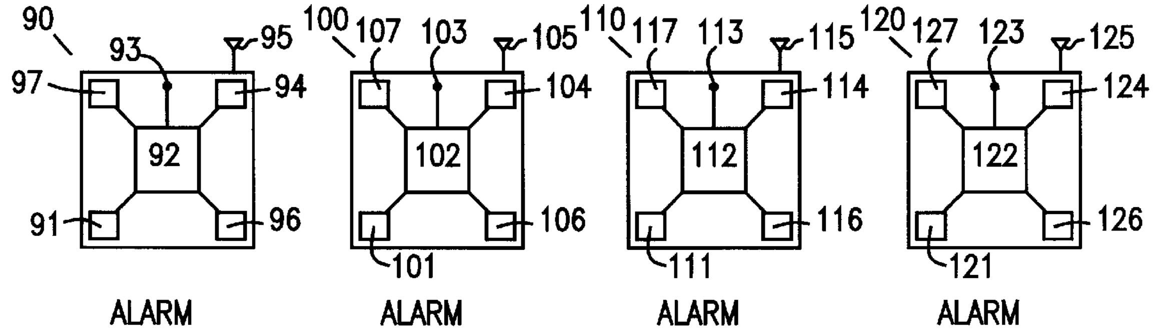

As one can ascertain, the detector system of the present invention provides not only for a network of similar battery operated detectors, but also an integrated network of battery operated wireless detectors or sensors. An integrated network is illustrated in FIGS. 9A–I, comprising a motion detector 90, smoke detectors 100, 110 and Carbon Monoxide detector 120. The arrangement is identical to that disclosed in FIG. 1, with the exception that each detector in the network in FIG. 9A–I clearly indicates its corresponding sensor type. Referring again to the arrangement in FIG. 9A–I, Motion detector 90 is within range of smoke detector 100 but not within range of smoke detector 110 or carbon monoxide detector 120. Smoke detector 100 is in range of detectors 90 and 110 but not detector 120. Smoke detector 110 is within range of both 110 and 120. All detectors in the network are equipped with sensors, controlling means, LED's, horns, transmitters and receivers. The sensors include an ion chamber 101 & 111 for smoke detectors 100 & 110, a laser 91 for motion detector 90, and a gas sensor 121 for carbon monoxide detector 120. The integrated detection system operation is described as follows. In response to movement in the vicinity of detector 90, the laser beam 91 indicates the presence of movement to controller 92, resulting in a transition from Standby mode to AUX3 mode indicative of motion detection. This condition is shown in FIG. 9B The LED 93 at detector 90 will flash and a horn 96 will sound indicative of the "motion alarm". Concurrently, an AUX3 transmission indicating the condition is initiated at transmitter 94 out antenna 95 to all other detectors. Smoke detector 100, upon receiving this RF transmission at receiver 107, changes to remote AUX3 mode, and retransmits the message for further propagation, as shown in FIG. 9C. However, at that same time, carbon monoxide detector 120 senses the occurrence of carbon monoxide gas at sensor 121 and in response, transitions to AUX2 mode, indicative of this phenomena, illuminating its LED 123 and sounding its horn 126 indicative of AUX2 mode, and transmitting an AUX2 RF message (FIG. 9D). Assuming both the AUX2 and AUX3 messages are received by smoke detector 110, the controller 112 prioritization scheme enables AUX2 mode at detector 110 and causes retransmission to all other detectors within range, because AUX2 has higher priority than AUX3 (FIG. 9E). Subsequently, smoke detector 100, upon receiving the AUX2 transmission from detector 110, transitions from AUX3 to AUX2 according to the priority scheme (FIG. 9F). The AUX2 RF message is then re-transmitted from smoke detector 100 and received by motion detector 90, which then transitions to AUX2 and sounds its horn alarm 96 indicating an AUX2 condition accordingly (FIG. 9G). If at this point, smoke detector 110 detects smoke at its ion chamber 101, then, in a similar manner, the alarm mode is entered, and the LED 103 flashes and horn 106 sounds in accordance with the alarm pattern (FIG. 9H). Transmitter 104 is enabled and an alarm message is transmitted over antenna 105. Similarly, all other detectors receive the alarm message, transition to alarm mode, sound their horn according to the alarm pattern, and retransmit the RF alarm message because of the higher priority of the alarm over AUX2 (FIG. 9I). Each unit that transitions to alarm mode remains latched in that mode until the reset push button is activated or reset RF message is received.

Accordingly, the different message types and prioritization scheme of the present invention enables different sensing detectors to communicate and relay information to one another in an effective manner.

As one can ascertain, the controller means for any detector in the network is operable to control all other detectors to achieve a particular state or mode (i.e. condition), without the need for any centrally located controller panel, control device or base station. Greater flexibility and hence, opportunity, to tailor the system according to the requirements of the specific application are thus provided in this network of battery-powered, wireless detector units while at the same time minimizing signal collision and network confusion by providing mechanisms for maintaining the network in an alarm condition and randomizing transmission times.

While there has been shown and described the preferred embodiments of the invention, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A wireless, battery-operated detection system of a plurality of RF-interconnected detectors operable over a CSMA-type network and intended to detect the occurrence of a local phenomena and transmit at least one signal to at least one other detector to remotely sound an alarm, each said detector operable in a plurality of modes including standby, alarm, test, reset, auxiliary and wait, each said detector comprising a sensor for sensing said local phenomena, a transmitter for transmitting amplitude modulated RF messages indicative of said phenomena, a receiver for receiving said RF messages, alarm means for sounding said audible alarm indicative of said phenomena and mode, and a controller operable to control the mode of operation of each said detector, each said controller operable to control all said detectors in said system in response to a stimulus and for controlling multiple and conflicting signals transmitted among said detectors, said controller including prioritization means for determining the relative priority of said received RF signals and stimuli indicative of a particular condition to enable the appropriate mode of operation;

timer means responsive to said detector operating mode for enabling said transmitter to transmit RF messages immediately after said receiver is sensed and no longer detects incoming message activity, wherein said receiver is sensed at a randomized time interval to reduce the probability of multiple simultaneous transmissions.

2. The system according to claim 1, wherein said controller further includes:

latch means responsive to said alarm mode of operation and operable to maintain said detector in the alarm state even after said sensor no longer detects the occurrence of said phenomena which initiated said alarm condition to prevent mode oscillation;

identification means including a settable dip switch for electronically distinguishing said network of detectors from other devices.

3. The system according to claim 1, further including light emitting means responsive to said controller for emitting and controlling flashing light patterns indicative of said phenomena detected.

4. The system according to claim 1, wherein each said detector in said network is a smoke detector, wherein said smoke detector sensor includes an ion chamber.

5. The system according to claim 1, wherein said system is an integrated system of detectors comprising smoke detectors and non-smoke detectors, said non-smoke detectors selected from the list consisting of fire detectors, heat detectors, photoelectric detectors, gas detectors, carbon-monoxide detectors, motion detectors and intrusion detectors.

6. The system according to claim 1, wherein said timer means includes a holdoff timer having a ripple counter for randomly delaying said sensing of the receiver to reduce the probability of multiple simultaneous transmissions when no RF signal data is present at said receiver.

7. The system according to claim 3, wherein for each said detector in said alarm mode, said receiver is continuously activated and periodically sampled after an initial transmission in said mode, to receive signal transmissions from said other detectors.

8. The system according to claim 1, wherein said relative priority of said received RF signals and stimuli indicative of a particular condition is reset, followed by alarm, AUX2, AUX3, and test each having successively lower priority.

9. The system according to claim 1, wherein said controller includes a customized ASIC chip.

10. The system according to claim 2, wherein each said transmitter includes coding means responsive to said controller for coding said transmitted RF signals to include a message type, system identification and fixed pattern indicative of said current mode of said transmitting detector;

wherein each said receiver includes decoding means responsive to said controller and transmitter and operable to receive said RF signals over a decode said RF signals and data checking means responsive to said decoding means for determining the validity of said received RF signals, wherein said message type selected from the list comprising RESET, ALARM, AUX2, AUX3, TEST message types.

11. A detector system comprising a plurality of battery-operated sensing devices interconnected over a wireless, CSMA-type RF network and intended to detect the occurrence of a local phenomena and transmit at least one amplitude modulated RF signal to at least one other sensing device to remotely sound an alarm, each said sensing device comprising:

sensor means for detecting said local phenomena indicative of an emergency condition, said emergency condition comprising a first priority alarm condition, and successively lower priority AUX2 condition, and AUX3 condition at said detector, reset means for generating a signal indicative of a first priority reset condition at said detector, wherein said reset condition is of higher priority than said alarm condition, transmitter means responsive to controller means for transmitting said amplitude modulated RF signal encoded with a predetermined code indicative of said priority emergency or reset conditions to other said detectors within operating range, receiver means for accepting and decoding remote AM RF signals indicative of said priority emergency or reset conditions from said other detectors, controller means responsive to said priority conditions received from said sensor means, reset means and receiver means, to cause said audible alarm to sound indicative of said highest priority condition received during a given time interval to alert local personnel, and to cause subsequent transmission of AM RF signal indicative of said highest priority condition, said controller means including timer means for sensing said receiver means a randomized time after first detecting said remote AM RF signal and providing a start signal to said transmitter means to initiate AM RF signal transmission, thereby reducing the probability of multiple simultaneous transmissions, wherein each said sensing device in said network is operable to control all other said remote sensing devices to either reset or sound an audible alarm indicative of said condition at each said remote device.

12. The system according to claim 11, wherein said emergency condition further comprises an AUX1 condition having a priority greater than said AUX2 and less than said alarm conditions.

13. The system according to claim 11, wherein said plurality of sensing devices comprise first type smoke sensors having sensor means for detecting smoke, second type carbon-monoxide sensors having sensor means for detecting gas, and third type motion sensors having sensor means for detecting movement, wherein each said type of sensing device has corresponding sensor means uniquely associated with one of said emergency priority conditions, wherein said transmitter means is operable to transmit said RF encoded signal indicative of said emergency priority condition associated with said sensor means type in response to said sensor means detecting said local phenomena.

14. The system according to claim 11, said controller means further including latch means to prevent sensing device oscillation among said priority conditions to maintain said sensing device in a state indicative of said first priority alarm condition after said sensor means no longer detects the occurrence of said phenomena.

15. The system according to claim 11, each said sensing device further including an at least one light emitting diode (LED) responsive to said controller means for emitting a light pattern indicative of said phenomena detected.

16. The system according to claim 1, further including test means for generating a test signal indicative of a test condition at each said sensing device, said test condition having lowest priority.

17. The system according to claim 11, wherein said timing control means includes a holdoff timer having a ripple counter for generating a random value indicative of a uniform time delay ranging from 0 to 6 seconds.

18. The system according to claim 11, wherein each said transmitter means of each sensing device in said system is inactive until said corresponding receiving means fails to detect RF message activity during a predetermined interval, and wherein said duration of each said RF transmission is substantially twenty-four seconds.

19. The system according to claim 11, wherein each said receiver means is enabled for a temporal interval of substantially 185 milliseconds which occurs every 18.75 seconds when said corresponding transmitter means is not active.

20. The system according to claim 19, wherein said receiving means is operable to decode said RF transmitted data only during the latter half of said temporal interval in which said receiver means is enabled.

21. The system according to claim 10, wherein each said transmitter is operable to transmit said RF signal indicative of said particular message type continuously for a duration of substantially 24 seconds.

22. The system according to claim 10, wherein said receiver is operable to receive said RF transmitted data during a temporal interval duration of substantially 185 milliseconds defining a receive window, which occurs every 18.75 seconds when said corresponding transmitter is not active.

23. The system according to claim 22, wherein said receiver is operable to decode said RF transmitted data only during the latter half of said receive window.

24. The system according to claim 23, wherein said data checking means includes:

means for determining whether said particular message type has been consecutively received during said receive window;

means for comparing said dip switch setting with said system identification field;

means for determining whether said received message type is indicative of a known message type.

* * * * *